United States Patent
Li

(10) Patent No.: US 10,877,898 B2
(45) Date of Patent: Dec. 29, 2020

(54) METHOD AND SYSTEM FOR ENHANCING FLASH TRANSLATION LAYER MAPPING FLEXIBILITY FOR PERFORMANCE AND LIFESPAN IMPROVEMENTS

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 117 days.

(21) Appl. No.: 15/815,510

(22) Filed: Nov. 16, 2017

(65) Prior Publication Data

US 2019/0146925 A1    May 16, 2019

(51) Int. Cl.
*G06F 12/00*   (2006.01)
*G06F 12/10*   (2016.01)
*G06F 13/00*   (2006.01)
*G06F 13/28*   (2006.01)

(52) U.S. Cl.
CPC ...... *G06F 12/10* (2013.01); *G06F 2212/1036* (2013.01); *G06F 2212/2022* (2013.01); *G06F 2212/7201* (2013.01); *G06F 2212/7205* (2013.01)

(58) Field of Classification Search
CPC ............ G06F 12/10; G06F 2212/1036; G06F 2212/7205; G06F 2212/7201; G06F 2212/2022

See application file for complete search history.

(56) References Cited

U.S. PATENT DOCUMENTS

| | | |
|---|---|---|
| 3,893,071 A | 7/1975 | Bossen |
| 4,718,067 A | 1/1988 | Peters |
| 4,775,932 A | 10/1988 | Oxley |
| 5,394,382 A | 2/1995 | Hu |
| 5,732,093 A | 3/1998 | Huang |
| 5,802,551 A | 9/1998 | Komatsu |
| 5,930,167 A | 7/1999 | Lee |

(Continued)

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSs'17, Sep. 2017, Mumbai, India. pp. 1-7, 2017, <10.1145/312460.3124741>. <hal-01654985>.

(Continued)

*Primary Examiner* — Mark A Giardino, Jr.
(74) *Attorney, Agent, or Firm* — Shun Yao; Park, Vaughan, Fleming & Dowler LLP

(57) ABSTRACT

One embodiment facilitates a reduced write amplification. During operation, the system receives, by a computing device, a request to write data to a non-volatile memory. The system writes a first page of the data to a block of the non-volatile memory based on a first physical block address of a destination page of the block, wherein the destination page is a first available page of the block. The system maps, in a data structure by a flash translation layer module of the computing device, a first logical block address of the first page of the data to the first physical block address.

20 Claims, 11 Drawing Sheets

(56) References Cited

U.S. PATENT DOCUMENTS

| | | |
|---|---|---|
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,280,472 B1 | 3/2016 | Dang |
| 9,280,487 B2 | 3/2016 | Candelaria |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,747,202 B1 | 8/2017 | Shaharabany |
| 9,875,053 B2 | 1/2018 | Frid |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,437,670 B1 | 10/2019 | Koltsidas |
| 2001/0032324 A1 | 10/2001 | Slaughter |
| 2002/0010783 A1 | 1/2002 | Primak |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0145274 A1 | 7/2003 | Hwang |
| 2003/0163594 A1* | 8/2003 | Aasheim ............ G06F 3/0619 719/310 |
| 2003/0163633 A1* | 8/2003 | Aasheim ............ G06F 3/0616 711/103 |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1* | 2/2008 | Lee .................. G06F 12/0246 711/103 |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0089544 A1 | 4/2009 | Liu |
| 2009/0113219 A1 | 4/2009 | Aharonov |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1* | 11/2012 | Yu .................. G06F 3/0608 714/773 |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |

(56) References Cited

U.S. PATENT DOCUMENTS

| | | |
|---|---|---|
| 2015/0347025 A1 | 12/2015 | Law |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077968 A1 | 3/2016 | Sela |
| 2016/0098344 A1 | 4/2016 | Gorobets |
| 2016/0098350 A1 | 4/2016 | Tang |
| 2016/0110254 A1 | 4/2016 | Cronie |
| 2016/0154601 A1 | 6/2016 | Chen |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0285976 A1 | 10/2017 | Durham |
| 2017/0286311 A1* | 10/2017 | Juenemann ............. G06F 12/10 |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0088867 A1 | 3/2018 | Kaminaga |
| 2018/0107591 A1 | 4/2018 | Smith |
| 2018/0143780 A1 | 5/2018 | Cho |
| 2018/0167268 A1 | 6/2018 | Liguori |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1* | 2/2019 | Jean ..................... G06F 3/0659 |
| 2019/0073262 A1 | 3/2019 | Chen |
| 2019/0171532 A1 | 6/2019 | Abadi |
| 2019/0205206 A1 | 7/2019 | Hornung |
| 2019/0227927 A1 | 7/2019 | Miao |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0097189 A1 | 3/2020 | Tao |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, "Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

* cited by examiner

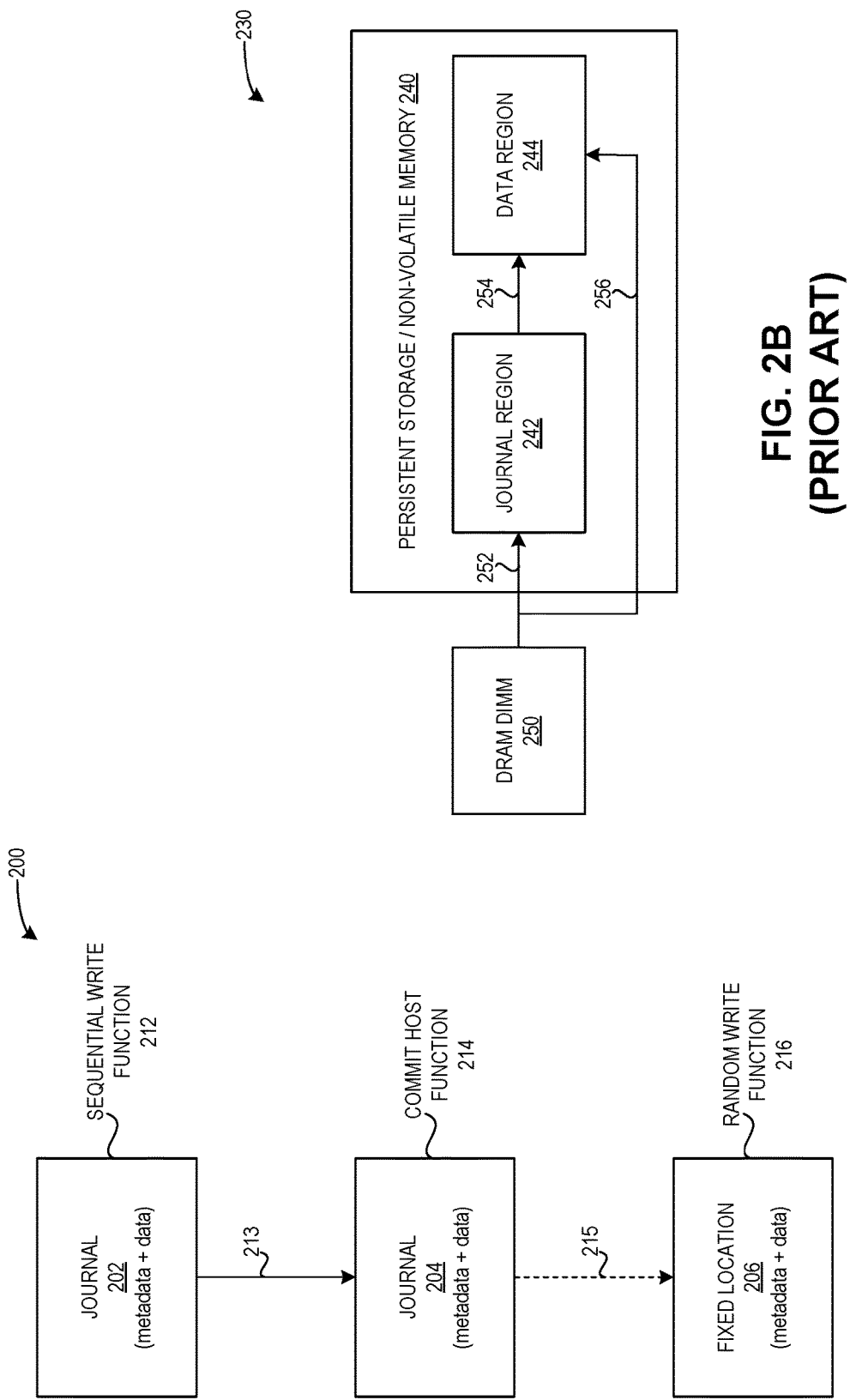

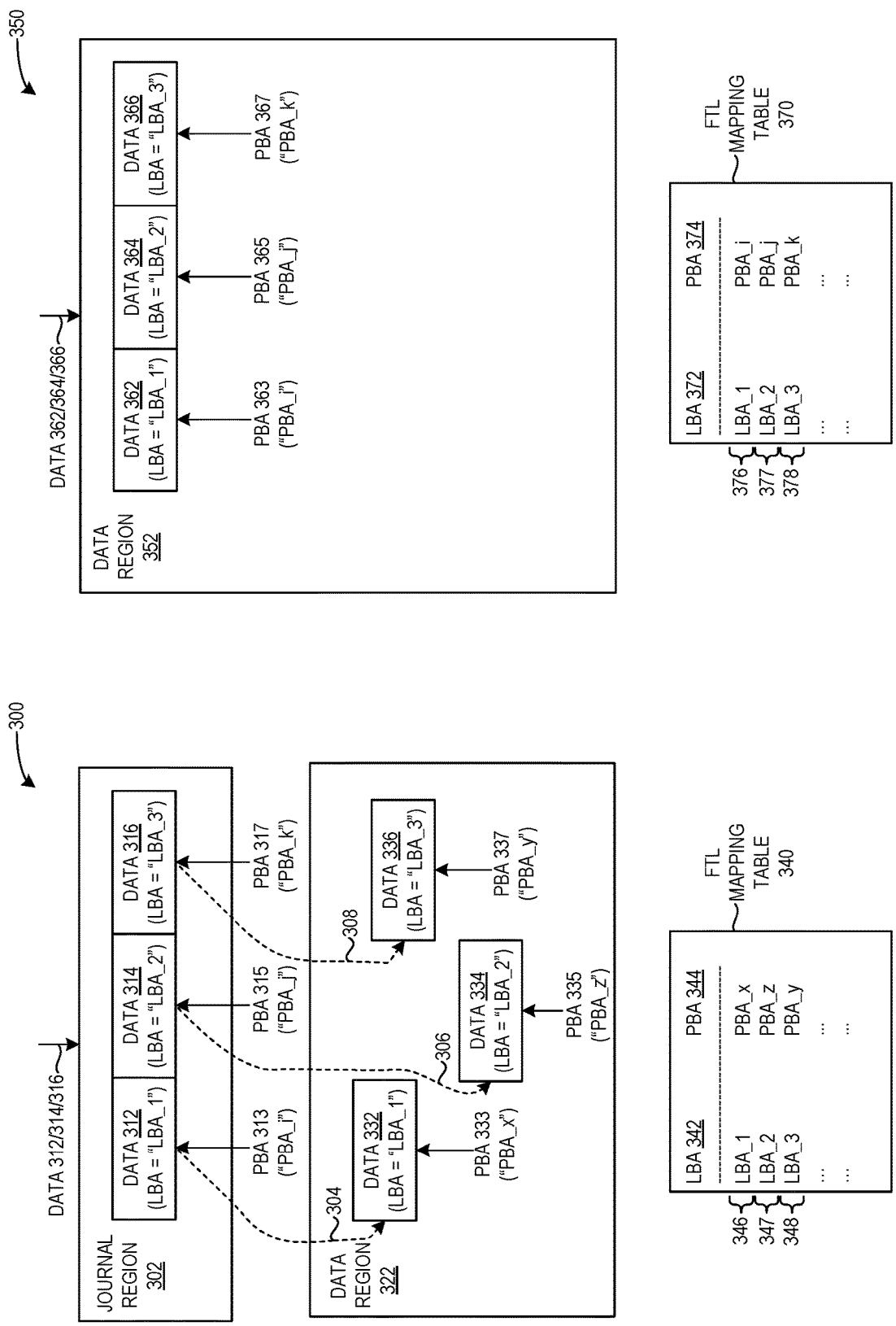

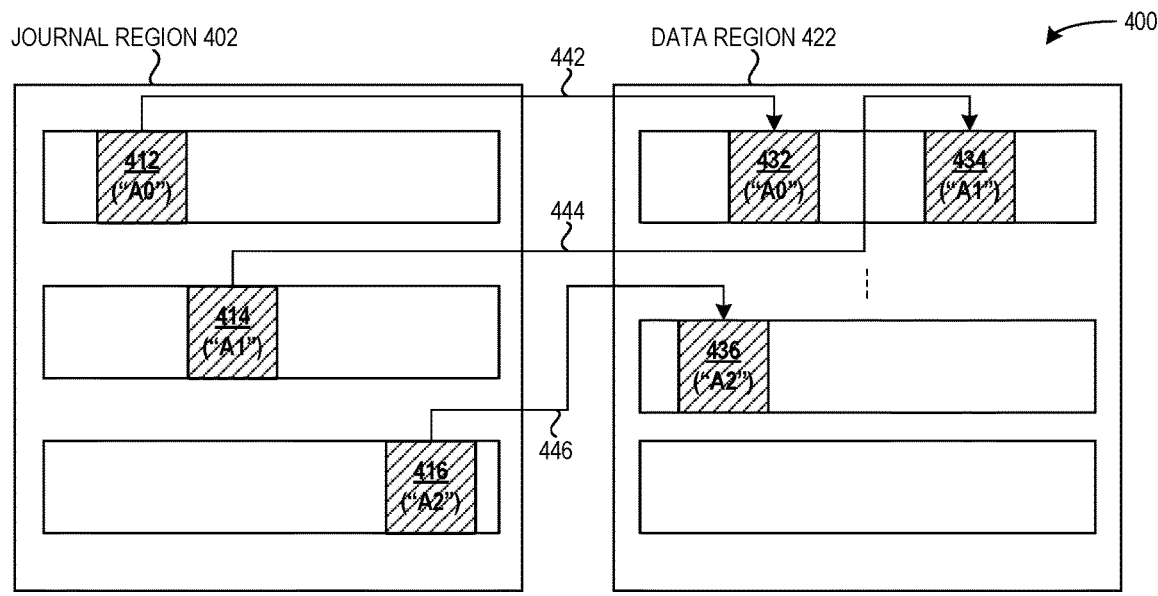
FIG. 4A (PRIOR ART)
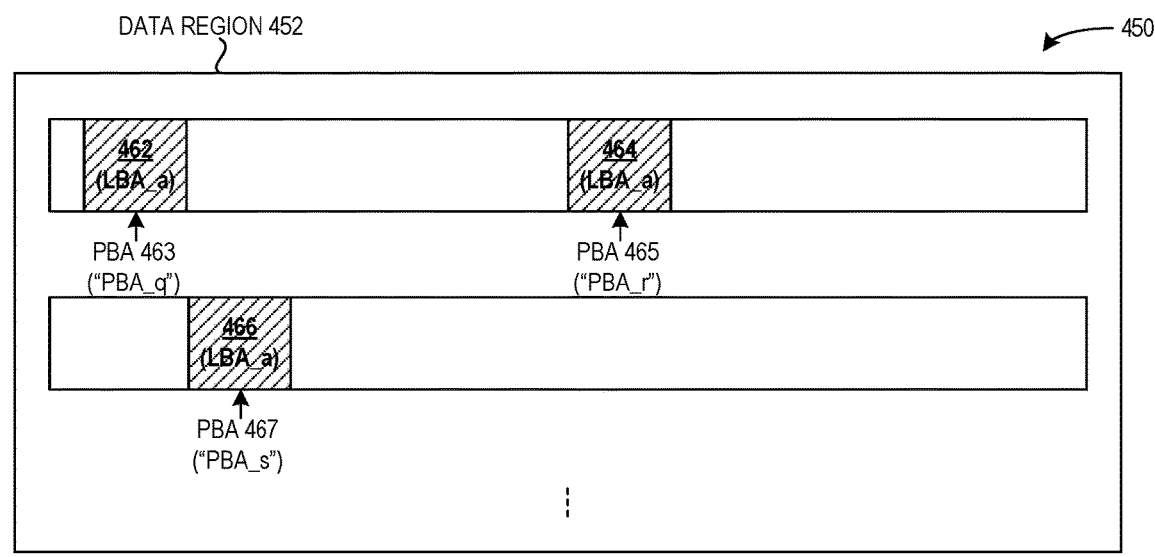
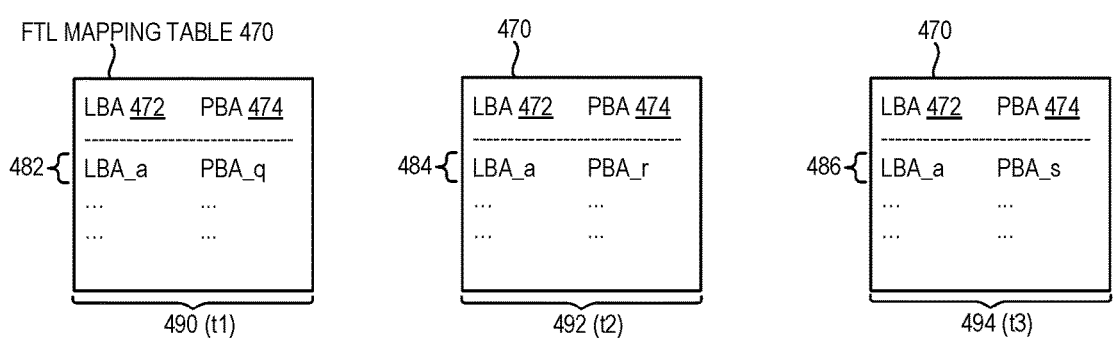
FIG. 4B

METHOD AND SYSTEM FOR ENHANCING FLASH TRANSLATION LAYER MAPPING FLEXIBILITY FOR PERFORMANCE AND LIFESPAN IMPROVEMENTS

BACKGROUND

Field

This disclosure is generally related to the field of data storage. More specifically, this disclosure is related to a method and system for enhancing the flexibility of mapping by the flash translation layer.

Related Art

The proliferation of the Internet and cloud-computing continues to create a vast amount of digital content. Various storage systems and servers have been created to access and store such digital content. A storage system or server can include multiple drives (e.g., a solid state drive (SSD)), and a drive can include non-volatile memory such as NAND flash for persistent storage. NAND flash consists of a die, which can include multiple planes, where a plane can include multiple blocks and a block can include multiple pages. Data can be read from or programmed on (e.g., written to) a NAND flash at the page level, and data can be erased from the NAND flash at the block level.

To provide fault-resiliency for stored data, a storage system may use a journaling file system which uses a journal to log changes before they are committed to the file system. One strategy for journaling is to use the full journal mode, in which the data is written twice: first, the system writes the data (i.e., both the metadata and the corresponding data) by blocks into the journal; and second, the system moves the data and writes the data to a fixed location on a drive. While the full journal mode can provide a high level of protection against file system corruption and data loss, the full journal mode may also result in a decreased performance based on the write amplification (due to writing the data twice—first to the journal and second to the fixed location).

Furthermore, data is programmed on (e.g., written to) NAND flash at the page level and in a fixed sequence, and stored in blocks or multiples of k pages (e.g., similar to RAID strips). However, because incoming data may not always be of a size equal to a full block size or a multiple of k pages, some pages of a block may be left open or unprogrammed. The raw bit error rate of an open block (e.g., a block with some unprogrammed pages) is higher than the raw bit error rate of a complete block (e.g., a block whose pages are all programmed). A conventional storage system addresses this issue by filling the open pages with dummy data, which can lead to unnecessary inefficiencies in the system. Moreover, the efficiency of the system may be limited by conventional garbage collection procedures.

SUMMARY

One embodiment facilitates a reduced write amplification. During operation, the system receives, by a computing device, a request to write data to a non-volatile memory. The system writes a first page of the data to a block of the non-volatile memory based on a first physical block address of a destination page of the block, wherein the destination page is a first available page of the block. The system maps, in a data structure by a flash translation layer module of the computing device, a first logical block address of the first page of the data to the first physical block address.

Another embodiment facilitates proactive garbage collection in a computing device. During operation, responsive to completing a request to write data to a non-volatile memory, the system: identifies, by the computing device, a block which is marked as eligible for recycling and which includes valid pages; copies the valid pages from the identified block to one or more blocks of the non-volatile memory to which the data is written, wherein a respective valid page is written to a first available page of a respective block; marks as invalid an original physical block address for the respective valid page; and maps, by a flash translation layer module of the computing device, a logical block address for the respective valid page to a physical block address for the first available page of the respective block, thereby facilitating proactive garbage collection.

In some embodiments, responsive to completing the request, and in response to determining that a first valid page of the identified block is to be read by the computing device, the system copies the first valid page to the one or more blocks prior to copying the valid pages to the one or more blocks.

In some embodiments, data is stored in the non-volatile memory based on a journaling file system.

In some embodiments, identifying the block which is marked as eligible for recycling is based on whether the block includes a number of valid pages less than a predetermined threshold.

In some embodiments, completing the request involves writing the data to the one or more blocks of the non-volatile memory in a sequential manner by: writing a first page of the data to the non-volatile memory based on a first physical block address of a destination page of the one or more blocks, wherein the destination page is a first available page of a respective block; and mapping, in a data structure by the flash translation layer module, a first logical block address of the first page of the data to the first physical block address.

In some embodiments, in response to determining that a search in the data structure for the first logical block address of the first page of the data returns the first physical block address, the system: replaces the first physical block address with a new physical block address; marks as invalid the first physical block address; and writes the first page of the data to the non-volatile memory based on the new physical block address.

In some embodiments, completing the request to request the data to the non-volatile memory comprises writing the data to one or more blocks of the non-volatile memory. Writing the data to the one or more blocks of the non-volatile memory in a sequential manner further comprises: distributing the data via a plurality of channels of the non-volatile memory; and writing the data to a respective block of the non-volatile memory, via a respective channel, based on a multiple of a fixed number of pages at a time, wherein the multiple of the fixed number of the pages is used for internal data recovery.

BRIEF DESCRIPTION OF THE FIGURES

FIG. 2A illustrates an exemplary communication for writing data to a non-volatile memory in a full journaling mode, in accordance with the prior art.

FIG. 2B illustrates an exemplary communication for writing data to a non-volatile memory in a full journaling mode, in accordance with the prior art.

FIG. 3A illustrates an exemplary communication and a data structure in writing data to a non-volatile memory in a journaling file system, in accordance with the prior art.

FIG. 3B illustrates an exemplary communication and a data structure in writing data to a non-volatile memory in a journaling file system, in accordance with an embodiment of the present application.

FIG. 4A illustrates an exemplary communication for updating data stored in a non-volatile memory in a journaling file system, in accordance with the prior art.

FIG. 4B illustrates an exemplary communication for updating data stored in a non-volatile memory in a journaling file system, in accordance with an embodiment of the present application.

In the figures, like reference numerals refer to the same figure elements.

DETAILED DESCRIPTION

Figure 1:
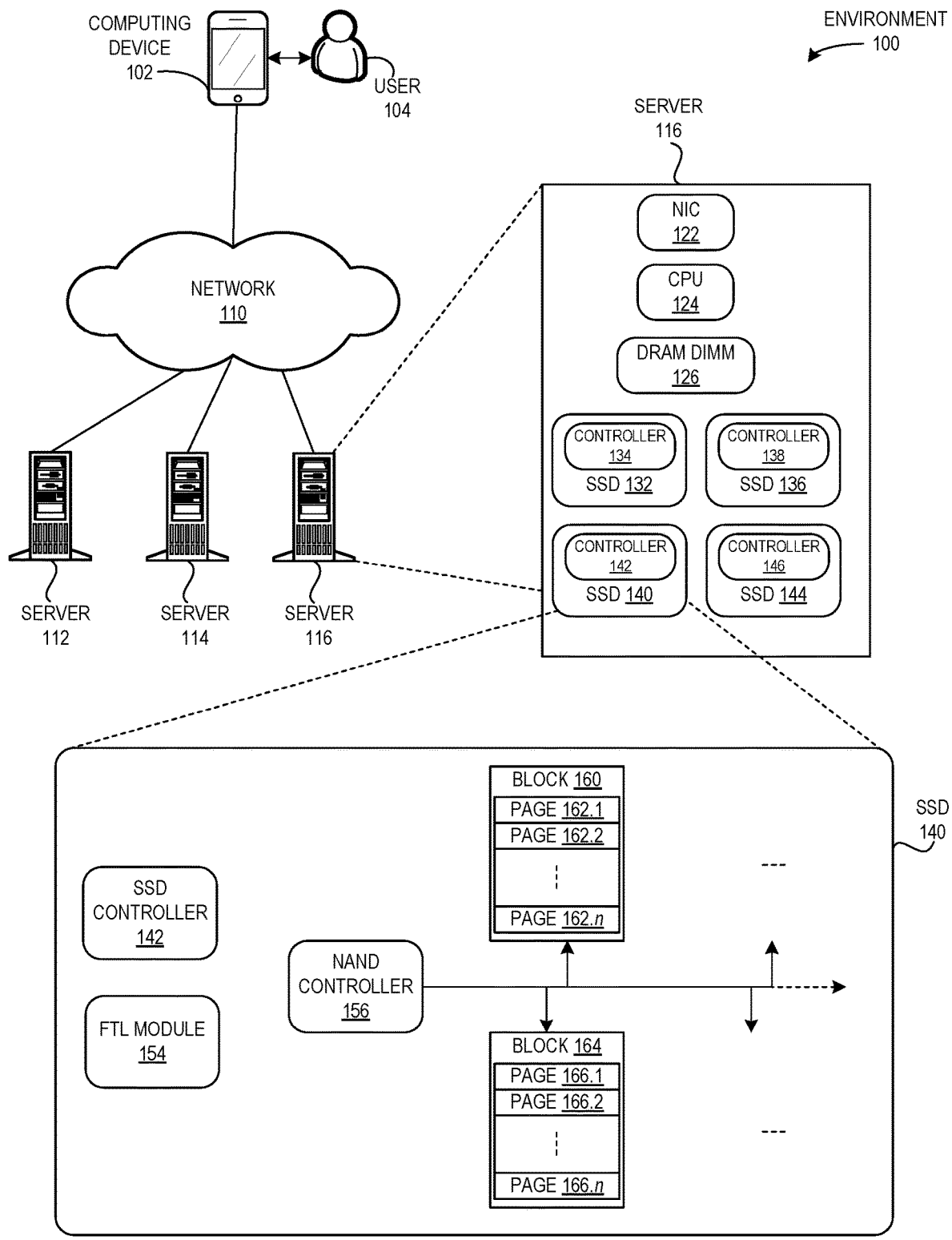
FIG. 1 illustrates an exemplary environment that facilitates proactive garbage collection, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of facilitating a reduced write amplification and efficient garbage collection by using an enhanced flash translation layer (FTL) mapping. As described above, using a full journal mode can provide a high level of protection against file system corruption and data loss, but may also result in a decreased performance based on the write amplification (i.e., due to writing the data twice—first to the journal and second to the fixed location). Furthermore, filling open pages in a NAND flash with dummy data can lead to unnecessary inefficiencies in the system. In addition, a controller or FTL module may be limited by the current methods used for garbage collection, which can also decrease the efficiency of the system.

The embodiments described herein address these inefficiencies by using an enhanced FTL mapping which reduces the write amplification, and also by using a host-triggered garbage collection method (which uses the enhanced FTL mapping). The write amplification which occurs in the full journal mode results from the system writing the data (and metadata) twice: first, to a journal region, and second, to a data region with a fixed location in a non-volatile memory (e.g., persistent storage), as described below in relation to FIGS. 2A, 2B, and 3A. The embodiments described herein solve this problem by using an FTL mapping table which obviates the need for "checkpointing" the data (i.e., writing the data first to the journal region), and thus records only the physical block address of the data as written once to the data region, as described below in relation to FIG. 3B.

Furthermore, data is programmed on NAND flash at a page level and in a fixed sequence, and stored in blocks or multiple of k pages. When pages of a block are left open or unprogrammed (e.g., when incoming data is not of a size exactly equal to a block size or a multiple of k), this may result in a higher raw bit error rate. A conventional system addresses this problem by filling the open pages with dummy data. However, this can result in inefficiencies. The embodiments described herein solve this problem by using a host-triggered garbage collection. That is, immediately after a host write request has been completed (and in some embodiments prior to notifying the host that the data has been committed), the system proactively identifies blocks which are eligible for recycling, and copies any valid pages in the identified blocks to the first available open page in a block with open pages (e.g., the position of the write pointer in the blocks to which the data has just been written). Proactive garbage collection is described below in relation to FIGS. 5, 6A, and 6B.

Thus, the embodiments described herein provide a system which increases the efficiency of a storage system. The increased efficiency can include a reduced write amplification, as well as an improved garbage collection. By enhancing the FTL mapping of logical block addresses to physical block addresses, the system obviates the need to write data twice, and further provides a proactive garbage collection which is triggered by a host-write. As a result, the embodiments described herein can provide improvements in both performance and lifespan, resulting in a more efficient storage system.

The term "storage server" or "storage system" refers to a server which can have multiple storage drives or storage devices, where data may be written to a drive or device for persistent storage.

The terms "storage-controlling module," "storage controller," and "controller" refer to a module or component located within a drive, and may be used interchangeably. In this disclosure, the storage controller can perform lookups in tables or data structures.

The term "host-triggered garbage collection" refers to embodiments described herein, in which the garbage collection process is triggered upon completion of processing a request to write data, as described below in relation to FIGS. 6A, 6B, 7A, and 7B.

Exemplary Environment

FIG. 1 illustrates an exemplary environment 100 that facilitates proactive garbage collection, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with storage servers 112, 114, and 116 (which can be part of a distributed storage system). A storage server can include multiple storage drives, and each drive can include a controller and multiple physical media for data storage.

For example, storage server 116 can include: a network interface card (NIC) 122; a central processing unit (CPU) 124; a DRAM DIMM 126; and a number of SSDs with controllers (e.g., an SSD 132 with a controller 134, an SSD 136 with a controller 138, an SSD 140 with a controller 142, and an SSD 144 with a controller 146). SSD 140 can include: SSD controller 142; a flash translation layer (FTL) module 154; a NAND controller 156; and multiple blocks which each include multiple pages (e.g., block 160 with pages 162.1-162.$n$ and block 164 with pages 166.1-166.$n$). Note that NAND controller 156 can communicate via a plurality of channels with multiple planes on a die, where a plane can include multiple blocks. An exemplary communication via a channel is described below in relation to FIGS. 3B, 4B, and 5.

Exemplary Communication in the Prior Art for Writing Data in a Full Journal Mode FIG. 2A illustrates an exemplary communication 200 for writing data to a non-volatile memory in a full journaling mode, in accordance with the prior art. During operation, data (e.g., metadata and data) can be written to a journal 202 via a sequential write function 212. Subsequently (as depicted by a solid line 213), the data can be committed to a journal 204 via a commit host function 214. At a later point (or asynchronously with the host write command, as depicted by a dashed line 215), the data may be written to a fixed location 206 (e.g., a non-volatile memory or other persistent storage) via a random write function 216.

FIG. 2B illustrates an exemplary communication 230 for writing data to a non-volatile memory in a full journaling mode, in accordance with the prior art. During operation, data can be written from DRAM DIMM 250 (via a communication 252) to a journal region 242. Subsequently (and similar to the asynchronous operation 215 of FIG. 2A), the data may be written into the mapped physical location (i.e., a data region 244) from either DRAM DIMM 250 (via a communication 256) or from journal region 242 (via a communication 254), that is, as a decoupled operation.

Thus, in the conventional system in the full journal mode, the data to be stored is written twice. The host memory (e.g., DRAM DIMM 250) remains dirty until the data is written into the data region, which results in a large write amplification and can result in an inefficient system.

FIG. 3A illustrates an exemplary communication 300 and a data structure 340 in writing data to a non-volatile memory in a journaling file system, in accordance with the prior art. During operation, a conventional system can receive data 312/314/316 (e.g., as part of a request to write data to a persistent storage of the system). Each of data 312/314/316 can be a block which has a logical block address, where a respective block is written sequentially to a journal region 302 based on consecutive physical block addresses (PBAs), such as a PBA 313 ("PBA_i"), a PBA 315 ("PBA_j"), and a PBA 317 ("PBA_k"). Subsequently, the conventional system can copy data 312/314/316 to a data region 322, where a respective block is written to a data region 322 in non-sequential order, based on a configuration of the persistent storage for the conventional system.

For example, data 312 can be written to data region 322 via a communication 304, at PBA 333 ("PBA_x") as data 332 (whose LBA is equal to "LBA_1"). Similarly, data 314 can be written to data region 322 via a communication 306, at PBA 335 ("PBA_z") as data 334 (whose LBA is equal to "LBA_2"). Also, data 316 can be written to data region 322 via a communication 308, at PBA 337 ("PBA_y") as data 336 (whose LBA is equal to "LBA_3"). The conventional system can maintain FTL mapping table 340, and, in response to communications 304, 306, and 308, update table 340 to include, respectively, entries 346, 347, and 348. Entry 346 can include a mapping of the LBA to the PBA in data region 322: {LBA_1; PBA_x}. Similarly, entries 347 and 348 can include, respectively: {LBA_2; PBA_z}; and {LBA_3; PBA_y}. Thus, the conventional system shown in FIG. 3A requires two separate write operations, where the FTL mapping includes the LBA to PBA mapping in the data region, i.e., from the second write operation. As discussed above, writing the data twice can result in a large write amplification, which can decrease the efficiency of the system.

Exemplary Communication for Writing Data in a Full Journal Mode

FIG. 3B illustrates an exemplary communication 350 and a data structure 370 in writing data to a non-volatile memory in a journaling file system, in accordance with an embodiment of the present application. During operation, the system can receive data 362/364/366 (e.g., as part of a request to write data to a persistent storage of the system). Each of data 362/364/366 can be a block which has a logical block address. Each block can be written sequentially to a data region 352 based on consecutive PBAs, such as a PBA 363 ("PBA_i"), a PBA 365 ("PBA_j"), and a PBA 367 ("PBA_k"). Next, instead of writing the data to a second region, the system can simply update FTL mapping table 370 to include, respectively, entries 376, 377, and 378. Entry 376 can include a mapping of the LBA to the PBA in data region 352: {LBA_1; PBA_i}. Similarly, entries 377 and 378 can include, respectively: {LBA_2; PBA_j}; and {LBA_3; PBA_k}. Thus, by enhancing the FTL module to map the LBA to a PBA only in a first data region, the system shown in FIG. 3B obviates the need for two separate write operations. By using the FTL mapping to eliminate the additional write operation, the embodiments described herein reduce the write amplification, which can result in an improved and more efficient system.

Figure 6A:
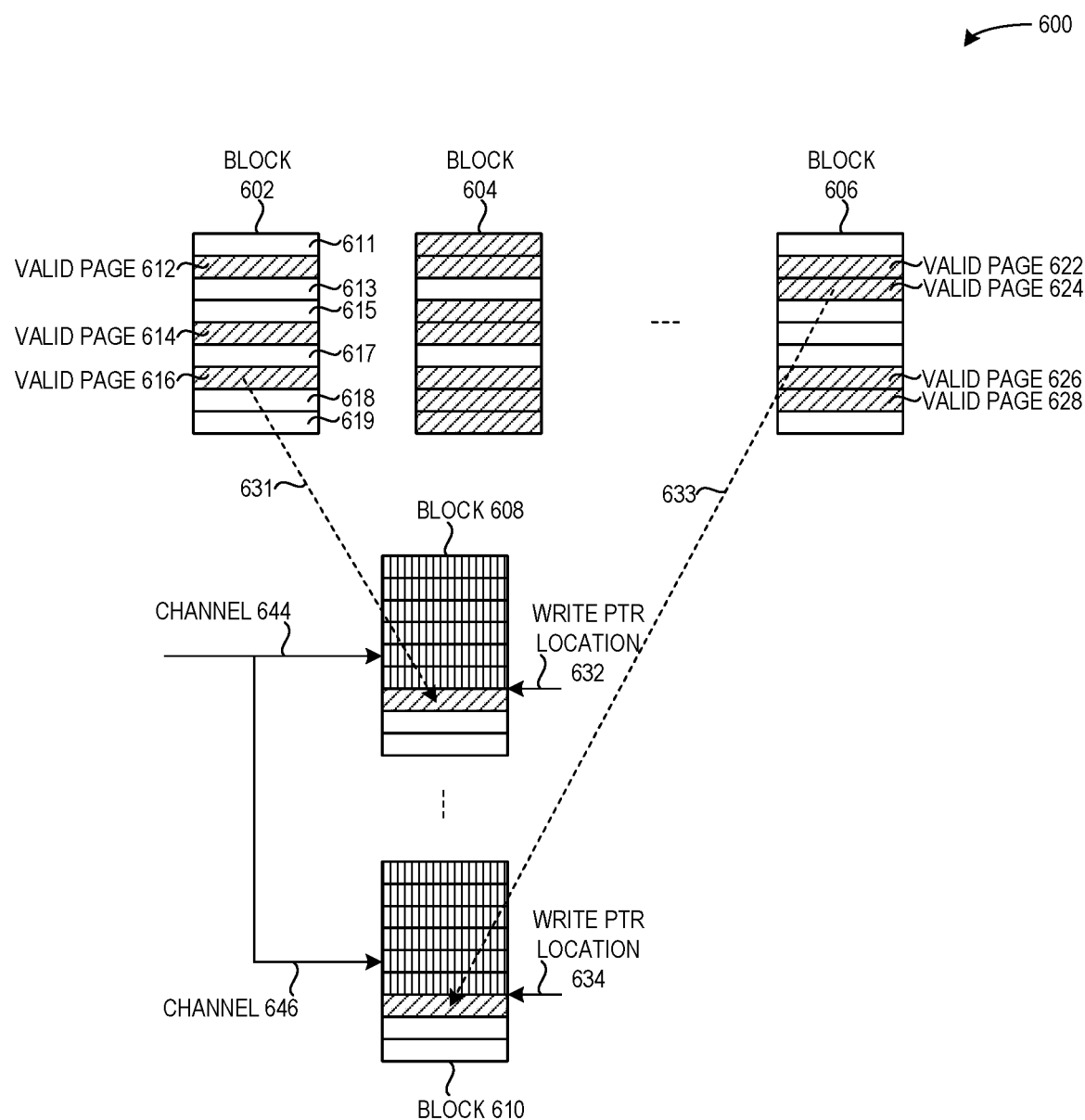
FIG. 6A illustrates an exemplary communication in a host-triggered garbage collection, in accordance with an embodiment of the present application.

Furthermore, if the data to be written includes an update to data which has already been written to the persistent storage, the system can also write the updated version in the full journal mode by simply writing to the data region, and by updating the FTL mapping table (e.g., by replacing the old PBA with a new PBA, and by marking the old PBA as invalid for garbage collection), as described below in relation to FIG. 4B (updating data) and FIGS. 6A and 6B (host-triggered garbage collection).

Updating Data in Full Journal Mode in the Prior Art Vs. in an Exemplary Embodiment FIG. 4A illustrates an exemplary communication 400 for updating data stored in a non-volatile memory in a journaling file system, in accordance with the prior art. Similar to communication 230 of FIG. 2B and communication 300 of FIG. 3A, the conventional system in FIG. 4A writes data twice: first to a journal region 402, and then to a data region 422. When the data to be written includes an update to data which has already been written to the persistent storage, the conventional system still writes the data twice, again resulting in a large write amplification. For example, upon receiving data 412 ("A0"), the conventional system can write data 412 first to journal region 402, and second to data region 422 as data 432 (via a communication 442). The conventional system can create an entry, in its FTL mapping table, which maps the LBA for A0 to the PBA at which data 432 is stored (as described above in relation to FIG. 3A). Upon receiving data 414 ("A1"), and determining that A1 is an update to A0, the system can write A1 first to journal region 402, and second to data region 422 as data 434 (via a communication 444). The conventional system can map the LBA for A1 to the PBA at which data 434 is stored. Upon receiving data 416 ("A2"), and determining that A2 is also an update to A0, the conventional system can write A2 first to journal region 402, and second to data region 422 as data 436 (via a communication 446). The conventional system can map the LBA for A2 to the PBA at which data 436 is stored. Thus, in the conventional system, this series of updates requires writing data six times to six different locations.

FIG. 4B illustrates an exemplary communication 450 for updating data stored in a non-volatile memory in a journaling file system, in accordance with an embodiment of the present application. Similar to communication 350 of FIG. 3B, the system in FIG. 4B writes data (including updates) only once to a data region 452. Upon receiving data 462, the system can write data 462 to data region 452, and create (or update) an entry in an FTL mapping table 470. Table 470 can include entries which map an LBA 472 to a PBA 474. For example, at a time 490 ($t1$), the system can create (or update) an entry 482 which maps the LBA for data 462 ("LBA_a") to a PBA 463 ("PBA_q") at which data 462 is stored. Upon receiving data 464, and determining that data 464 is an update to data 462, the system can write data 464 to data region 452, and update entry 482 in table 470 by mapping the LBA for data 464 ("LBA_a") to a PBA 465 ("PBA_r") at which data 464 is stored (entry 484 at a time 492 ($t2$)). Finally, upon receiving data 466, and determining that data 466 is an update to data 462 (or 464), the system can write data 466 to data region 452, and update entry 484 in table 470 by mapping the LBA for data 466 ("LBA_a") to a PBA 467 ("PBA_s") at which data 466 is stored (entry 486 at a time 494 ($t3$)). Thus, in contrast to the conventional system of FIG. 4A, in the system of FIG. 4B, this series of updates only requires writing data three times to three different locations, which reduces the write amplification and can improve the efficiency and performance of the system.

Exemplary Architecture for Sequentially Writing Data Via a Plurality of Channels In the embodiments of the system described herein, data is written to the non-volatile memory sequentially ("sequential write"). The system can extract multiple channels to work in parallel. To increase the throughput, the system can distribute the pages of the data to be written via a plurality of channels of the non-volatile memory.

In NAND flash memory, internal data recovery is stored similar to RAID. Based on a fixed number of pages as the user data, a RAID group can generate the RAID parity. Both the user data and the parity data are written to the NAND media. A RAID group may use a fixed number (k) of pages at a time. However, incoming data may not always be of a size which is a multiple of k, which results in some pages of a block being left open or unprogrammed. The raw bit error rate of an open block (e.g., a block with some unprogrammed pages) is higher than the raw bit error rate of a complete block (e.g., a block whose pages are all programmed). If a certain number of pages of a block are left open or unprogrammed, this may trigger certain RAID groups in an open status and which are waiting for more pages to complete the k pages of data. In a conventional system, the controller can generate dummy data to fill the open recovery group. However, this may result in inefficiencies in the system.

Figure 5:
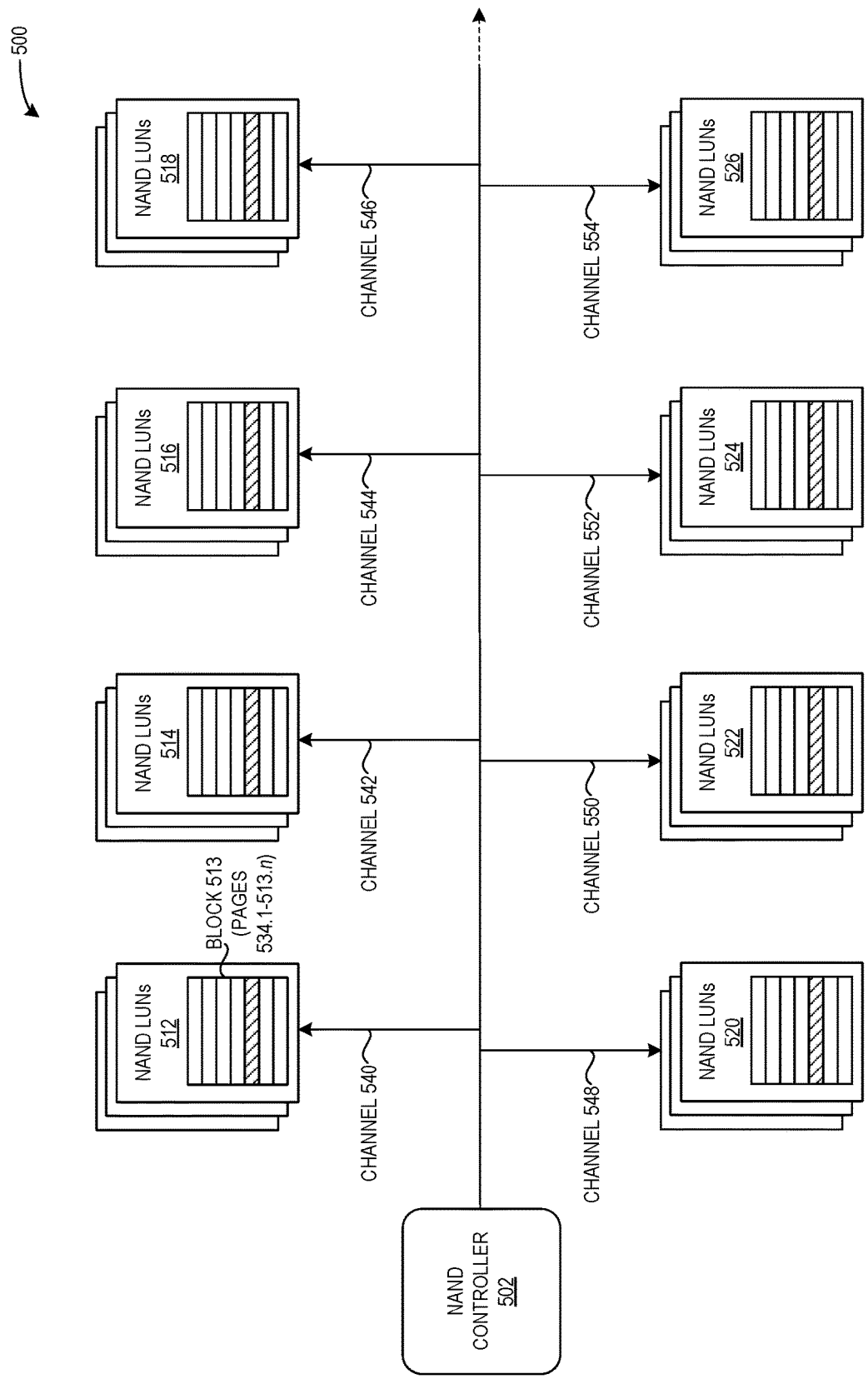
FIG. 5 illustrates an exemplary architecture for sequentially writing data via a plurality of channels in a non-volatile memory, in accordance with an embodiment of the present application.

The embodiments described herein solve this problem by copying valid pages (of blocks set to be recycled) to fill any open pages subsequent to a sequential write. FIG. 5 illustrates an exemplary architecture 500 for sequentially writing data via a plurality of channels in a non-volatile memory, in accordance with an embodiment of the present application. Architecture 500 can indicate a non-volatile memory which includes a NAND controller 502, which communicates via a plurality of channels 540-554 with, respectively, a plurality of NAND LUNs 512-526. A NAND LUN can include a plurality of blocks, which can each include a plurality of pages. For example, NAND LUN 512 can include a block 513 with pages 513.1-513.$n$.

Exemplary Communication in Host-Triggered Garbage Collection; An Exemplary Optimization for Host-Read Data FIG. 6A illustrates an exemplary communication 600 in a host-triggered garbage collection, in accordance with an embodiment of the present application. Communication 600 can occur in a non-volatile memory, such as a NAND flash storage as depicted in FIG. 5. During operation, the system can perform a sequential write of data (i.e., to a data region as described above in relation to FIG. 3B). The data can be sequentially written to, e.g., block 608 and block 610, via, respectively, channel 644 and channel 646 (as shown by the vertically striped boxes). At the same time, the non-volatile memory can include blocks which have a varying number or percentage of valid pages (indicated by a diagonally striped box) as compared to open or invalid pages (indicated by a white box). These blocks may be marked as eligible for recycling based on various conditions, e.g., whether the block includes a number or percentage of valid pages less than a predetermined threshold, whether a certain percentage of the valid pages in the block are set to expire, or based on a predetermined time period or interval. For example, block 602 can include open pages 611, 613, 615, 617, 618, and 619, and valid pages 612, 614, and 616, and can be marked as eligible for recycling because block 602 includes fewer than, e.g., 50% of valid pages. Similarly, block 606 can include four valid pages 622, 624, 626, and 628, and can also be marked as eligible for recycling because block 606 includes fewer than 50% of valid pages.

Upon completing the sequential write, the system can determine that blocks 608 and 610 include open pages which need to be filled. Rather than filling these open pages with dummy data, the system can identify blocks which are marked as eligible or ready for recycling ("marked block") and which include valid pages, e.g., blocks 602 and 606. The system can copy valid pages from marked blocks 602 and 606 to blocks 608 and 610, starting at the write pointer location, which indicates the location at which the last data was sequentially written to the non-volatile memory. For example, the system can copy valid page 616 from block 602 to block 608 at a write pointer location 632 (function 631), and can simply modify the LBA to PBA mapping for the copied valid page (as described above in relation to FIGS. 3B and 4B). The system can also mark the original PBA as invalid (or open). Similarly, the system can copy valid page 624 from block 606 to block 610 at a write pointer location 634 (function 633), and can modify the LBA to PBA mapping for the copied valid page.

Thus, by using a sequential write (which is a host-triggered operation) to trigger copying valid pages from a marked block to fill an open block, the system can save an additional NAND read operation from the marked block. The system can further mitigate any potential impact due to a host I/O operation caused by the garbage collection, which can also save on NAND bandwidth.

Figure 6B:
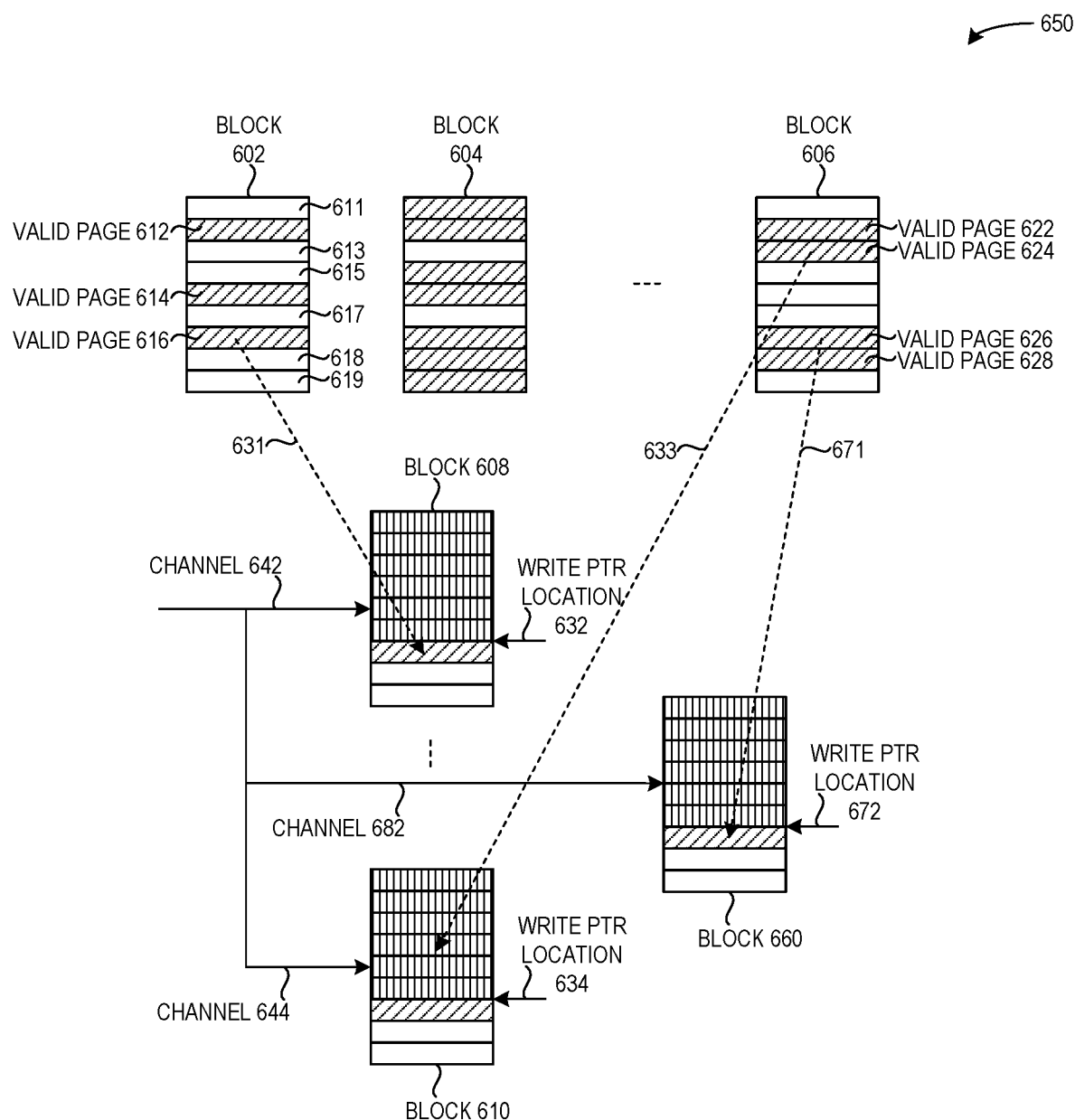
FIG. 6B illustrates an exemplary communication in a host-triggered garbage collection, including processing a host read with a higher priority for recycling, in accordance with an embodiment of the present application.

FIG. 6B illustrates an exemplary communication 650 in a host-triggered garbage collection, including processing a host read with a higher priority for recycling, in accordance with an embodiment of the present application. Communication 650 is similar to communication 600, and further includes the prioritization of a host read, that is, when the host reads a valid page of a (marked) block to be recycled. When the current write NAND (i.e., blocks 608, 610, and 660) has an open block or strip, and when the host or computing device reads a valid page from a marked block, the system can prioritize the page to be read by recycling it prior to recycling (i.e., copying) the other valid pages of the marked block.

For example, upon completing the sequential write, the system can determine that blocks 608, 610, and 660 include open pages which need to be filled. The system can copy valid pages from marked blocks (e.g., blocks identified as eligible or ready for recycling), such as blocks 602 and 606. The system can determine that valid page 626 of marked block 606 is to be read by the host or computing device, and assign a higher priority to this page for recycling, e.g., copy valid page 626 from block 606 to block 660 at a write pointer location 672 (function 671) prior to copying the other valid pages from block 606 (i.e., prior to copying valid page 624 to block 610, as described above in relation to FIG. 6A). The system can also update the LBA to PBA mapping information for valid page 624. In this manner, the flexibility of the FTL mapping table allows the proactive garbage collection to occur more efficiently, including the prioritization of recycling pages to be read by the host.

Furthermore, the host-triggered garbage collection (described above in relation to FIGS. 6A and 6B) is not limited to a host write operation. As long as the system performs a host read of a valid page of a block to be recycled, the system can write that valid page in the journal manner (e.g., append the valid page at the end of the written pages), and the FTL module or the controller can update the LBA to PBA mapping accordingly.

The embodiments described herein provide a system which enhances the flexibility of the flash translation layer in NAND storage by mapping the journal area instead of copying data, and further supports the host-triggered garbage collection. The enhanced FTL mapping can obviate the double-write behavior, reduce the wear of NAND, and increase the efficiency of the capacity utilization of the system. The host-triggered garbage collection can save an additional read, mitigate the effects of noise caused by read operations, and stabilize the I/O performance.

Method for Facilitating Proactive Garbage Collection in a Computing Device

Figure 7A:
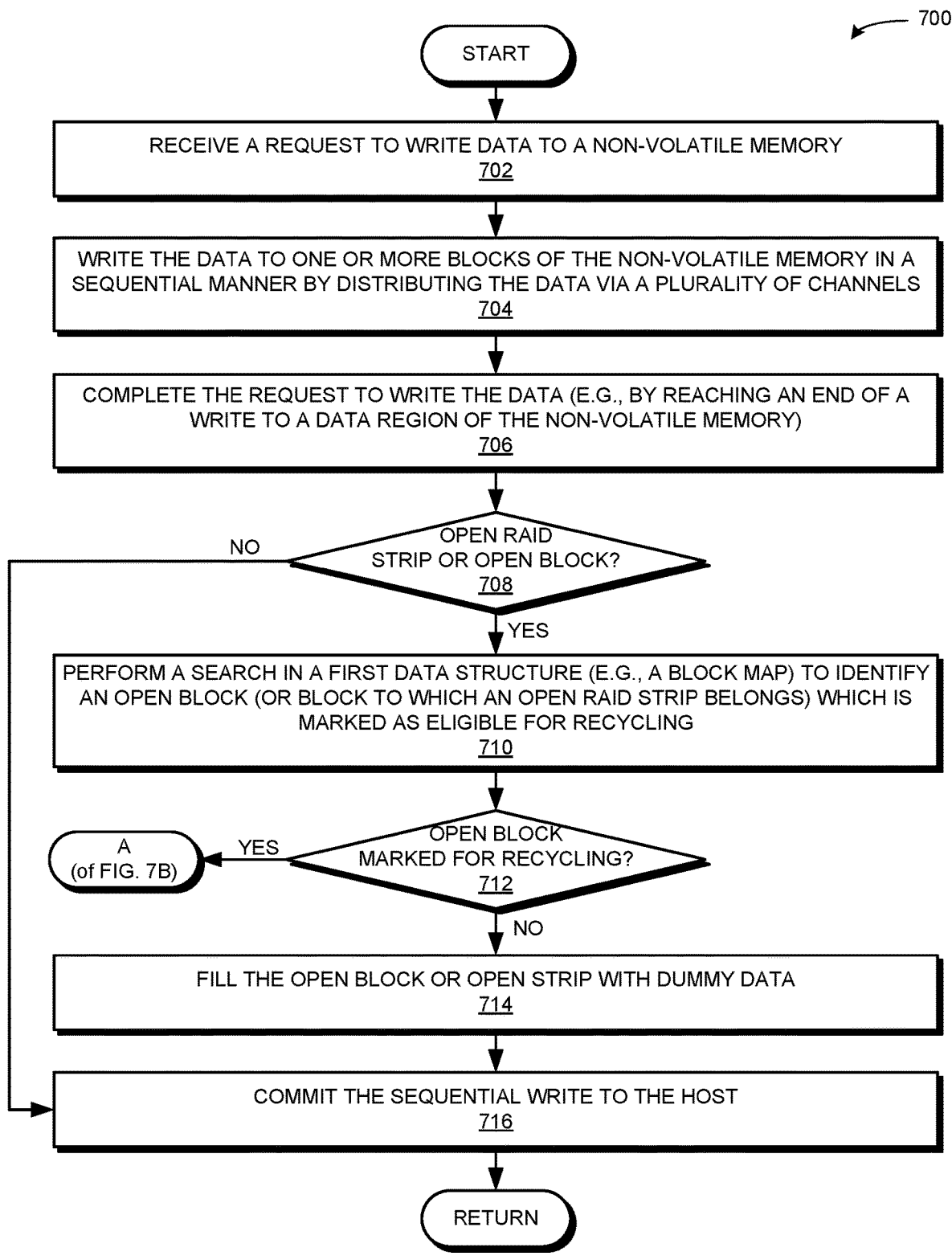
FIG. 7A presents a flowchart illustrating a method for facilitating proactive garbage collection, in accordance with an embodiment of the present application.

FIG. 7A presents a flowchart 700 illustrating a method for facilitating proactive garbage collection, in accordance with an embodiment of the present application. During operation, the system receives a request to write data to a non-volatile memory (operation 702). The system writes the data to one or more blocks of the non-volatile memory in a sequential manner by distributing the data via a plurality of channels (operation 704). The system completes the request to write the data (e.g., by reaching an end of a write to a data region of the non-volatile memory) (operation 706). If there is not an open RAID strip or an open block after completing the sequential write (decision 708), the system commits the sequential write to the host (operation 716), and the operation returns.

If there is an open RAID strip or an open block after completing the sequential write (decision 708), the system performs a search in a first data structure (e.g., a block map) to identify an open block (or block to which an open RAID strip belongs) which is marked as eligible for recycling (operation 710).

Figure 7B:
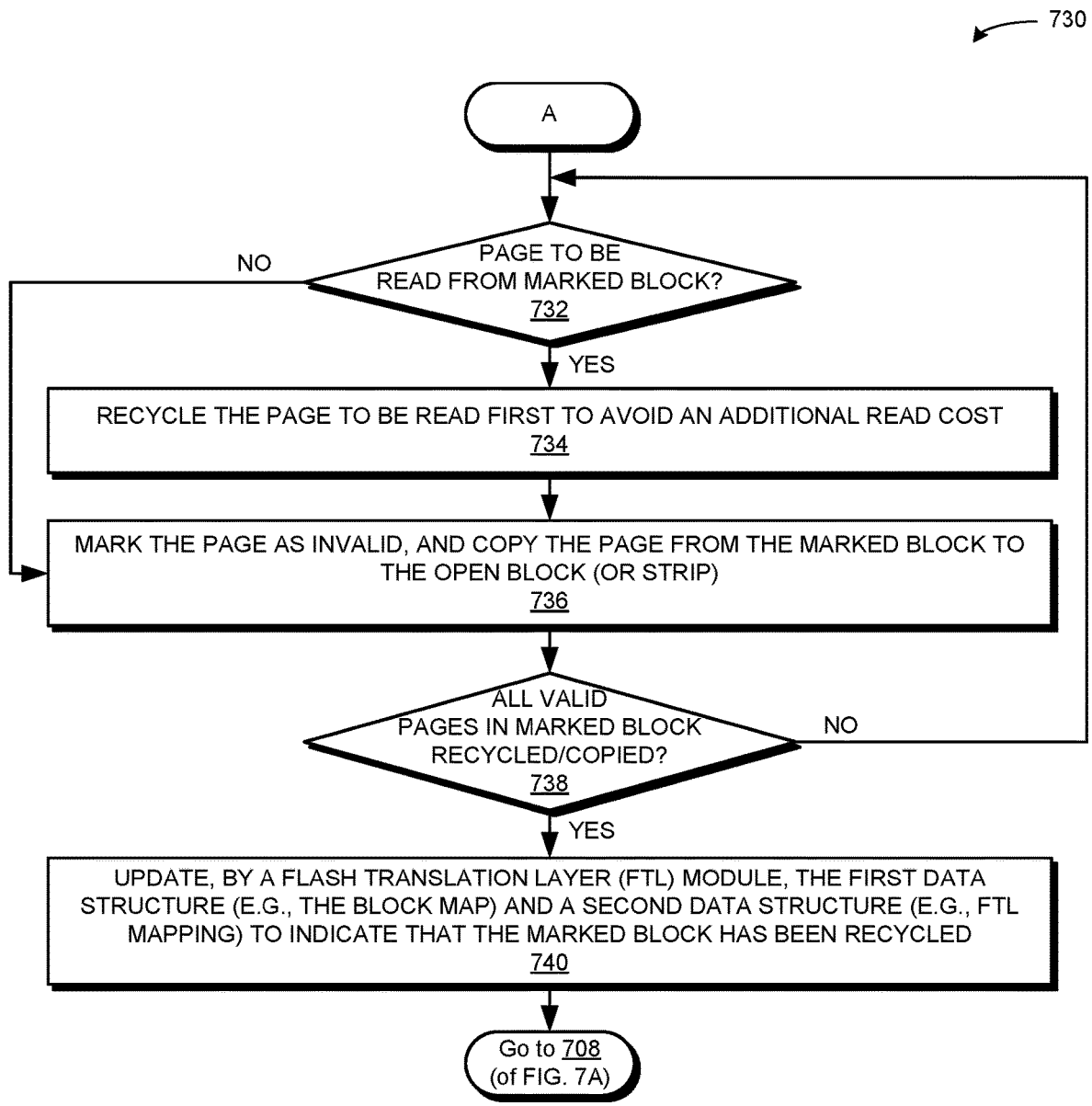
FIG. 7B presents a flowchart illustrating a method for facilitating proactive garbage collection, in accordance with an embodiment of the present application.

If an open block is marked for recycling (decision 712), the operation continues as described at Label A of FIG. 7B. If an open block is not marked for recycling (decision 712), the system fills the open block or open strip with dummy data (operation 714) and commits the sequential write to the host (operation 716). Note that operation 714 only occurs when the system is at the beginning of the block.

FIG. 7B presents a flowchart 730 illustrating a method for facilitating proactive garbage collection, in accordance with an embodiment of the present application. During operation, if there is a valid page to be read from the marked block (decision 732), the system recycles the page to be read first to avoid an additional read cost (operation 734). If there is not a valid page to be read form the marked block (decision 732), the system begins recycling valid pages from the marked block. The system marks a valid page as invalid, and copies the valid page from the marked block to the open block (or strip) (operation 736). If all the valid pages in the marked block are not recycled (decision 738) (i.e., if there are any remaining pages not yet recycled in the marked block), the operation returns to Label A to process any remaining valid pages. If all the valid pages in the marked block are recycled (decision 738), the system updates, by a flash translation layer (FTL) module, the first data structure (e.g., the block map) and a second data structure (e.g., FTL mapping) to indicate that the marked block has been recycled (operation 740). The system then continues at operation 708 of FIG. 7A.

Exemplary Computer System and Apparatus

Figure 8:
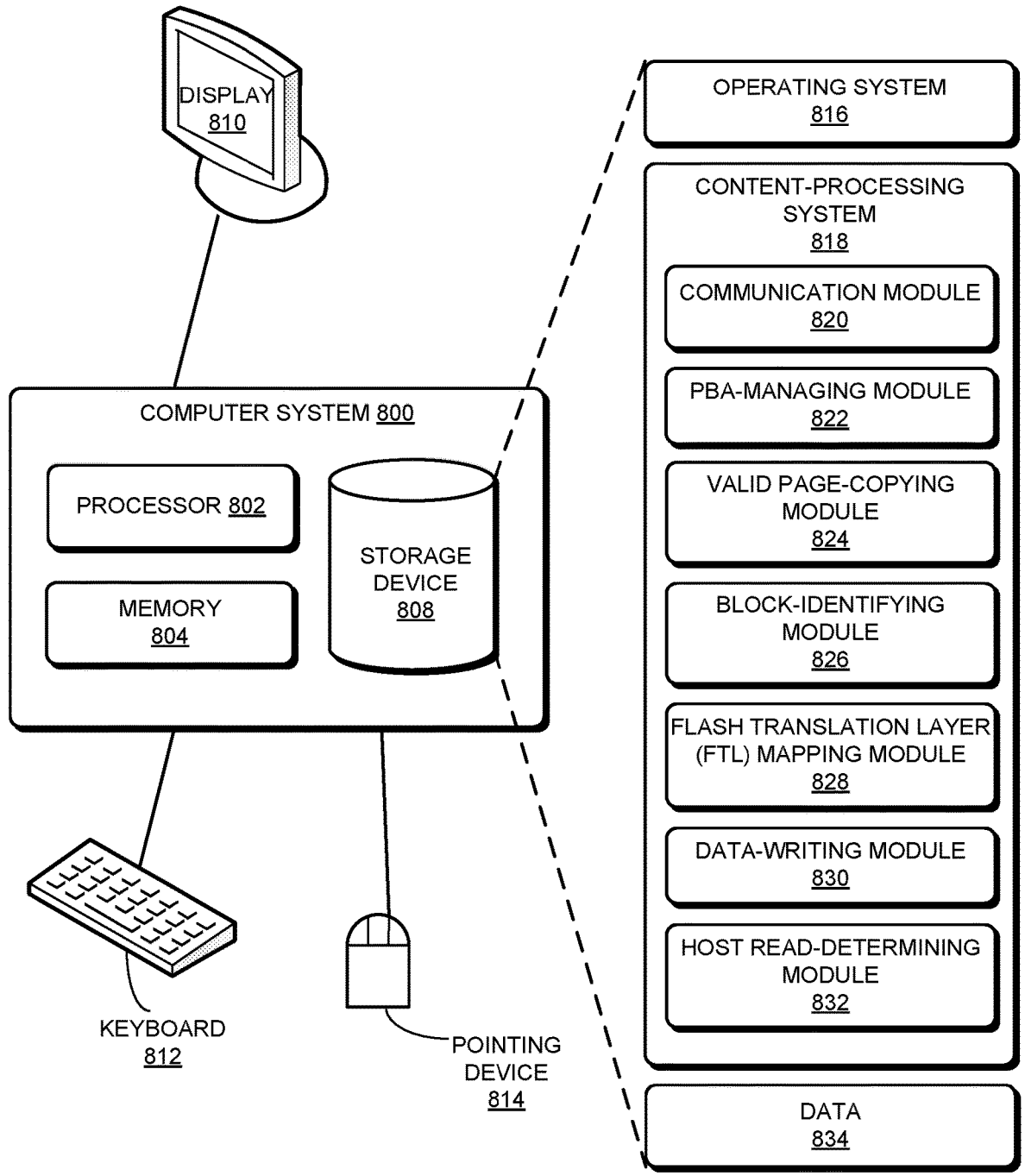
FIG. 8 illustrates an exemplary computer system that facilitates proactive garbage collection, in accordance with an embodiment of the present application.

FIG. 8 illustrates an exemplary computer system 800 that facilitates proactive garbage collection, in accordance with an embodiment of the present application. Computer system 800 includes a processor 802, a memory 804, and a storage device 808. Computer system 800 may be computing device or a storage device. Memory 804 can include a volatile memory (e.g., RAM) that serves as a managed memory, and can be used to store one or more memory pools. Furthermore, computer system 800 can be coupled to a display device 810, a keyboard 812, and a pointing device 814. Storage device 808 can store an operating system 816, a content-processing system 818, and data 834.

Content-processing system 818 can include instructions, which when executed by computer system 800, can cause computer system 800 to perform methods and/or processes described in this disclosure. For example, content-processing system 818 can include instructions for receiving and transmitting data packets, including a request to write or read data, data to be encoded and stored, or a block or a page of data. Content-processing system 818 can further include instructions for completing a request to write data to a non-volatile memory (data-writing module 830). Content-processing system 818 can include instructions for identifying, by the computing device, a block which is marked as eligible for recycling and which includes valid pages (block-identifying module 826). Content-processing system 818 can include instructions for copying the valid pages from the identified block to one or more blocks of the non-volatile memory to which the data is written (valid page-copying module 824). Content-processing system 818 can include instructions for marking as invalid an original physical block address for the respective valid page (PBA-managing module 822). Content-processing system 818 can include instructions for mapping, by a flash translation layer module of the computing device, a logical block address for the respective valid page to a physical block address for the first available page of the respective block (FTL mapping module 828).

Content-processing system 818 can further include instructions for, in response to determining that a first valid page of the identified block is to be read by the computing device (host read-determining module 832), copying the first valid page to the one or more blocks prior to copying the valid pages to the one or more blocks (valid page-copying module 824).

Data 834 can include any data that is required as input or that is generated as output by the methods and/or processes described in this disclosure. Specifically, data 834 can store at least: data to be stored, written, retrieved, or copied; a block of data; an indicator that a block is marked as eligible for recycling; a valid page or programmed; an open or unprogrammed page; a page or a block to be recycled; a logical block address (LBA); a physical block address (PBA); a first data structure; a block map; an entry in a table; a mapping of an LBA to a PBA; an end of a sequential write; a first available page of a block; a write pointer location; a journaling file system; a number of pages; a number of valid pages; a predetermined threshold; a channel; a fixed number of pages; and a multiple of a fixed number of pages.

Figure 9:
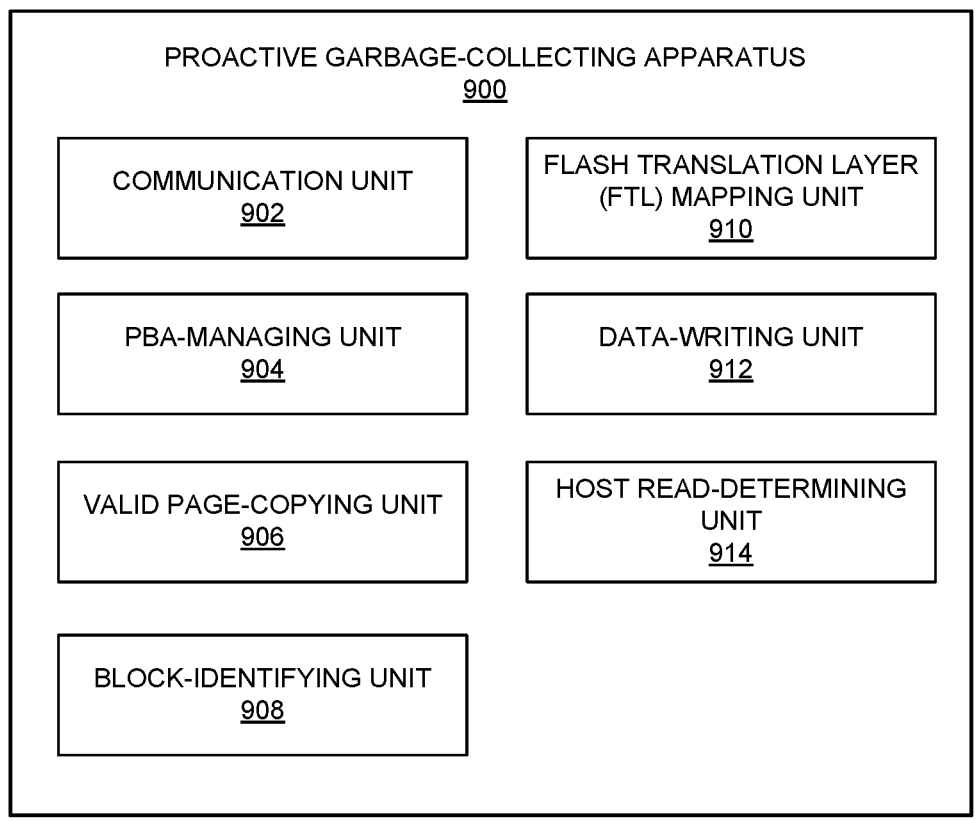
FIG. 9 illustrates an exemplary apparatus that facilitates proactive garbage collection, in accordance with an embodiment of the present application.

FIG. 9 illustrates an exemplary apparatus 900 that facilitates proactive garbage collection, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-914 which perform functions or operations similar to modules 820-832 of computer system 800 of FIG. 8, including: a communication unit 902; a PBA-managing unit 904; a valid page-copying unit 906; a block-identifying unit 908; a flash translation layer (FTL) mapping unit 910; a data-writing unit 912; and a host read-determining unit 914.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a reduced write amplification, the method comprising:
   receiving, by a computing device, a first request to write data to a non-volatile memory;
   writing a first page of the data to a first block of the non-volatile memory based on a first physical block address of a destination page of the first block, wherein the destination page is a first available page of the first block;
   mapping, in a data structure by a flash translation layer module of the computing device, a first logical block address of the first page of the data to the first physical block address;
   receiving a second request to read data from a second page of a second block which is marked as eligible for recycling;
   assigning a priority to the second page, wherein the assigned priority indicates that the second page is to be copied in a next host-triggered garbage collection prior to other valid pages of the second block being copied; and
   responsive to completion of the first request to write the data to the non-volatile memory, directly triggering the next host-triggered garbage collection, which comprises:
      identifying, by the computing device, the second block for recycling, wherein the second block includes valid pages which comprise the second page with the assigned priority and the other valid pages;
      copying the second page with the assigned priority from the second block prior to copying the other valid pages from the second block to one or more blocks of the non-volatile memory, wherein a respective valid page is written to a first available page of a respective block;
      marking as invalid an original physical block address for the respective valid page; and
      mapping, by the flash translation layer module, a logical block address for the respective valid page to a physical block address for the first available page of the respective block.

2. The method of claim 1, wherein in response to determining that a search in the data structure for the first logical block address of the first page of the data returns the first physical block address, the method further comprises:

replacing the first physical block address with a new physical block address;
marking as invalid the first physical block address; and
writing the first page of the data to the non-volatile memory based on the new physical block address.

3. The method of claim 1, wherein completing the first request to write the data to the non-volatile memory comprises writing the data to the one or more blocks of the non-volatile memory in a sequential manner by:
distributing the data via a plurality of channels of the non-volatile memory; and
writing the data to a respective block of the non-volatile memory, via a respective channel, based on a multiple of a fixed number of pages at a time, wherein the multiple of the fixed number of the pages is used for internal data recovery.

4. The method of claim 1, wherein data is stored in the non-volatile memory based on a journaling file system.

5. The method of claim 1, wherein responsive to completing the first request, the method further comprises:
in response to determining that a first valid page of the identified second block is to be read by the computing device, copying the first valid page to the one or more blocks prior to copying the valid pages to the one or more blocks.

6. The method of claim 1, wherein identifying the second block which is marked as eligible for recycling is based on whether the second block includes a number of valid pages less than a predetermined threshold.

7. The method of claim 1, wherein directly triggering the next host-triggered garbage collection is performed prior to notifying a host that the data has been committed.

8. The method of claim 1, further comprising:
receiving a plurality of requests to write data to the non-volatile memory; and
responsive to completion of each respective request to write the data to the non-volatile memory, directly triggering the next host-triggered garbage collection.

9. The method of claim 1, wherein the next host-triggered garbage collection is a proactive garbage collection which is triggered in response to each of a plurality of received requests to write data to the non-volatile memory.

10. A computer system for facilitating a reduced write amplification, the system comprising:
a processor; and
a memory coupled to the processor and storing instructions, which when executed by the processor cause the processor to perform a method, the method comprising:
receiving, by the computer system, a first request to write data to a non-volatile memory;
writing a first page of the data to a first block of the non-volatile memory based on a first physical block address of a destination page of the first block, wherein the destination page is a first available page of the first block;
mapping, in a data structure by a flash translation layer module of the computer system, a first logical block address of the first page of the data to the first physical block address;
receiving a second request to read data from a second page of a second block which is marked as eligible for recycling;
assigning a priority to the second page, wherein the assigned priority indicates that the second page is to be copied in a next host-triggered garbage collection prior to other valid pages of the second block being copied; and
responsive to completion of the first request to write the data to the non-volatile memory, directly triggering the next host-triggered garbage collection, which comprises:
identifying, by the computing device, the second block for recycling, wherein the second block includes valid pages which comprise the second page with the assigned priority and the other valid pages;
copying the second page with the assigned priority from the second block prior to copying the other valid pages from the second block to one or more blocks of the non-volatile memory, wherein a respective valid page is written to a first available page of a respective block;
marking as invalid an original physical block address for the respective valid page; and
mapping, by the flash translation layer module, a logical block address for the respective valid page to a physical block address for the first available page of the respective block.

11. The computer system of claim 10, wherein in response to determining that a search in the data structure for the first logical block address of the first page of the data returns the first physical block address, the method further comprises:
replacing the first physical block address with a new physical block address;
marking as invalid the first physical block address; and
writing the first page of the data to the non-volatile memory based on the new physical block address.

12. The computer system of claim 10, wherein completing the first request to write the data to the non-volatile memory comprises writing the data to the one or more blocks of the non-volatile memory in a sequential manner by:
distributing the data via a plurality of channels of the non-volatile memory; and
writing the data to a respective block of the non-volatile memory, via a respective channel, based on a multiple of a fixed number of pages at a time, wherein the multiple of the fixed number of the pages is used for internal data recovery.

13. The computer system of claim 10, wherein data is stored in the non-volatile memory based on a journaling file system.

14. The computer system of claim 10, wherein responsive to completing the first request, the method further comprises:
in response to determining that a first valid page of the identified second block is to be read by the computer system, copying the first valid page to the one or more blocks prior to copying the valid pages to the one or more blocks.

15. The computer system of claim 10, wherein identifying the second block which is marked as eligible for recycling is based on whether the second block includes a number of valid pages less than a predetermined threshold.

16. A computer-implemented method for facilitating proactive garbage collection in a computing device, the method comprising:
receiving a first request to write first data to a non-volatile memory;
writing a first page of the data to a first block of the non-volatile memory based on a first physical block address of a destination page of the first block, wherein the destination page is a first available page of the first block;

mapping, in a data structure by a flash translation layer module of the computing device, a first logical block address of the first page of the data to the first physical block address;

receiving a second request to read data from a second page of a second block which is marked as eligible for recycling;

assigning a priority to the second page, wherein the assigned priority indicates that the second page is to be copied in a next host-triggered garbage collection prior to other valid pages of the second block being copied; and responsive to completion of the first request to write the data to the non-volatile memory, directly triggering the next host-triggered garbage collection, by:

identifying, by the computing device, the second block for recycling, wherein the second block includes valid pages which comprise the second page with the assigned priority and the other valid pages;

copying the second page with the assigned priority from the second block prior to copying the other valid pages from the second block to one or more blocks of the non-volatile memory, wherein a respective valid page is written to a first available page of a respective block;

marking as invalid an original physical block address for the respective valid page; and mapping, by a flash translation layer module of the computing device, a logical block address for the respective valid page to a physical block address for the first available page of the respective block, thereby facilitating proactive garbage collection.

17. The method of claim 16, wherein responsive to completing the first request, the method further comprises:

in response to determining that a first valid page of the identified second block is to be read by the computing device, copying the first valid page to the one or more blocks prior to copying the valid pages to the one or more blocks.

18. The method of claim 16, wherein data is stored in the non-volatile memory based on a journaling file system.

19. The method of claim 16, wherein completing the first request to write the data to the non-volatile memory involves writing the data to the one or more blocks of the non-volatile memory in a sequential manner by:

distributing the data via a plurality of channels of the non-volatile memory; and writing the data to a respective block of the non-volatile memory, via a respective channel, based on a multiple of a fixed number of pages at a time, wherein the multiple of the fixed number of the pages is used for internal data recovery.

20. The method of claim 19, wherein in response to determining that a search in the data structure for the first logical block address of the first page of the data returns the first physical block address, the method further comprises:

replacing the first physical block address with a new physical block address;

marking as invalid the first physical block address; and writing the first page of the data to the non-volatile memory based on the new physical block address.

* * * * *